United States Patent [19]
Campbell et al.

[11] Patent Number: 5,264,981
[45] Date of Patent: Nov. 23, 1993

[54] MULTILAYERED FERROMAGNETIC FILM AND MAGNETIC HEAD EMPLOYING THE SAME

[75] Inventors: Richard T. Campbell, Campbell; Jyh-Shuey J. Lo, San Jose, both of Calif.

[73] Assignee: International Business Machines Corporation, Armonk, N.Y.

[21] Appl. No.: 745,039

[22] Filed: Aug. 14, 1991

[51] Int. Cl.$^5$ .................. C23C 30/00; C21D 1/04; G11B 5/147; G11B 5/11
[52] U.S. Cl. ................... 360/126; 427/131; 427/599; 428/693
[58] Field of Search ............. 360/126; 428/668, 679, 428/627, 693; 427/599, 131

[56]  References Cited
U.S. PATENT DOCUMENTS

| | | | |
|---|---|---|---|
| 3,124,490 | 3/1964 | Schmeckenbecher | 420/459 |
| 3,975,772 | 8/1976 | Lin | 360/113 |
| 4,190,872 | 2/1980 | Jones et al. | 360/125 |
| 4,504,880 | 3/1985 | Church et al. | 360/113 |
| 4,610,935 | 9/1986 | Kumasaka et al. | 428/632 |
| 4,748,089 | 5/1988 | Kumasaka et al. | 428/635 |
| 5,034,273 | 7/1991 | Sakakima et al. | 428/336 |
| 5,068,147 | 11/1991 | Hori et al. | 428/336 |
| 5,142,768 | 9/1992 | Aboaf et al. | 29/603 |
| 5,147,734 | 9/1992 | Nakamura et al. | 428/694 |

FOREIGN PATENT DOCUMENTS 0247868  5/1987  European Pat. Off. .

Primary Examiner—Constantine Hannaher
Attorney, Agent, or Firm—Otto Schmid, Jr.; Leslie G. Murray

[57] ABSTRACT

A soft magnetic film includes a laminated structure having an alternating plurality of first magnetic and second magnetic film. The first magnetic films is of a predetermined thickness range and is made of a magnetic alloy of nickel, iron and nitrogen with the nitrogen present from greater than zero to 20 atomic percent. The second magnetic film is of a predetermined thickness range and is made of a magnetic alloy of iron and nitrogen with the nitrogen present from greater than zero to about 20 atomic percent. The films can be annealed in an applied magnetic field. The multilayer films have application as pole pieces and shields in magnetic heads. The magnetic heads are for use in dynamic storage systems including disk and tape media.

32 Claims, 7 Drawing Sheets

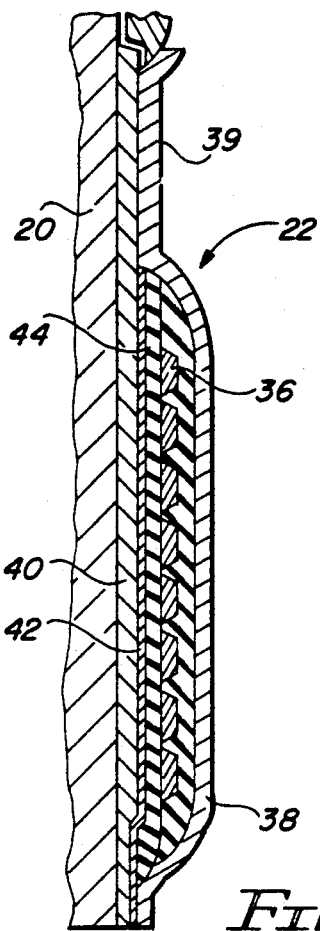
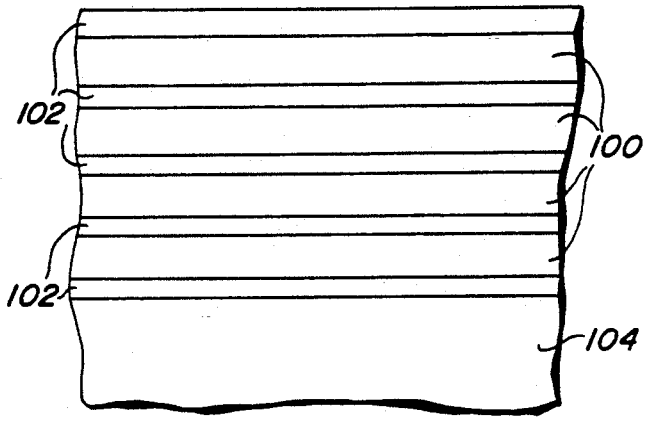
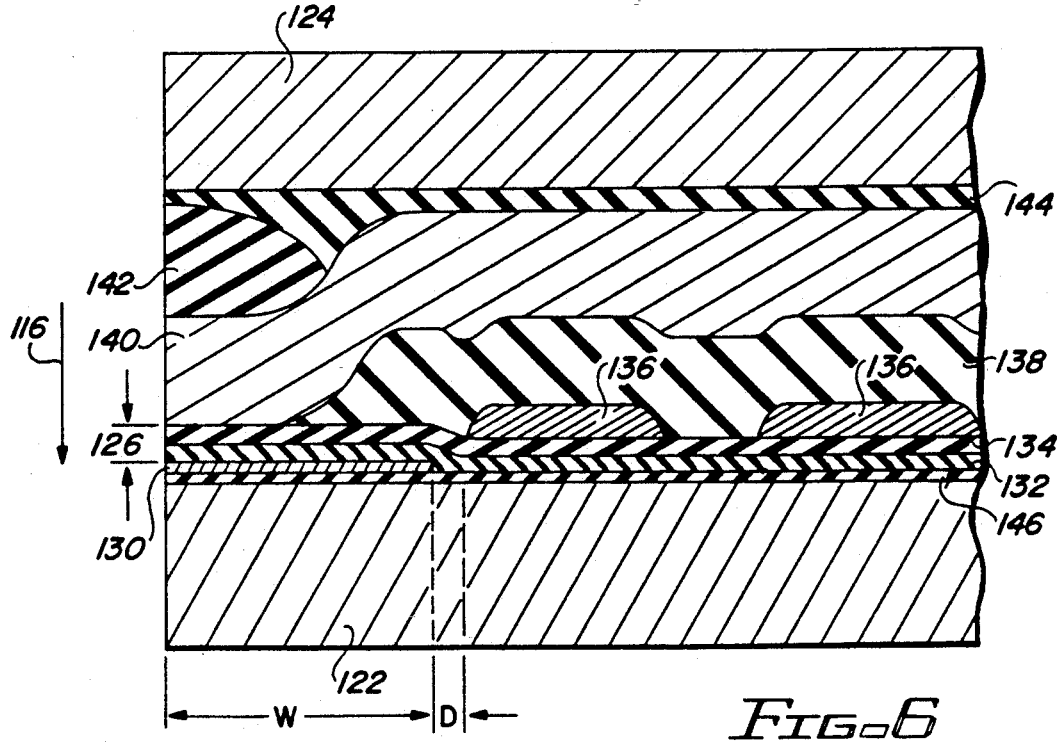

MULTILAYERED FERROMAGNETIC FILM AND MAGNETIC HEAD EMPLOYING THE SAME

TECHNICAL FIELD

This invention relates generally to a multilayered ferromagnetic anisotropic film having high saturation flux density, high permeability, low coercive force and low saturation magnetostriction, as well as high wear resistance and a magnetic head as part of a storage subsystem employing the film. More particularly, the invention pertains to the ferromagnetic material useful for pole pieces and shields in a magnetic head for high density magnetic recording.

BACKGROUND OF THE INVENTION

In a magnetic transducer, a given combination of pole tip and gap dimensions, film thickness and yoke geometry using high saturation magnetization and high permeability alloy have proven to be superior for high density recording, especially with respect to the ability to write high coercivity recording medium. A typical high saturation magnetization alloy is nickel-iron in the ratio of 45 percent nickel to 55 percent iron. A common high permeability alloy is permalloy which is a nickel-iron alloy having approximately 80 percent nickel and 20 percent iron. At the location where the pole tip region initially saturates, the high saturation magnetization 45/55 NiFe alloy permits more flux to be transmitted to the pole tips and to the recording media. Typical thin film transducer head structures have a particular yoke structure formed of a single magnetic layer while having its pole structure wider and thicker in the back gap region and narrower and thinner in the pole tip region. Such a structure is shown in U.S. Pat. No. 4,190,872 issued to Jones, et al., and assigned to the assignee of the present invention.

In the single layered nickel-iron films, the magnetic film structures are constructed of a laminated structure having a plurality of magnetic layers. The Kumasaka, et al., U.S. Pat. No. 4,610,935, entitled "Magnetic Film Structure" describes a laminated thin film structure having a plurality of magnetic layers containing iron or cobalt as the principal constituent and an intermediate very thin layer of a nickel and iron alloy or an amorphous magnetic alloy. A plurality of the laminated layers can be placed together, separated by a nonmagnetic isolation layer. The magnetic film structure is said to have high saturation magnetic induction and a low coercive force.

A Kumasaka, et al., U.S. Pat. No. 4,748,089, entitled "Multilayered Ferromagnetic Amorphous Alloy Film and Magnetic Head Employing the Same," describes a magnetic head having at least a portion of its pole pieces formed of a multilayered film of a main film and a spacer lamination. The main magnetic film is a binary system amorphous alloy with its principal component of a material selected from the group consisting of cobalt, iron and nickel. The spacer magnetic film is made from a polycrystalline or amorphous ferromagnetic material. No nitrogen is included as a component of either magnetic layer.

A European patent publication 0247868 to Kobayashi, et al., entitled "Magnetic Film and Magnetic Head Using the Same," having a publication date of Dec. 2, 1987, describes a magnetic film having ferromagnetic layers of nickel and iron alternated with a layer of iron and one or more elements selected from the group of boron, nitrogen, carbon and phosphorus which are elements that are interstitially soluble in iron. A multilayer magnetic film made of the alternating layers is said to enable an increase in the relative permeability.

A U.S. Pat. No. 3,124,490, issued to Schmeckenbecher, entitled "Variable Access Magnetic Films," describes magnetic films having a small amount of an interstitial element which is capable of occupying positions in the interstices in the film lattice. Carbon, nitrogen, boron, phosphorus and sulfur are mentioned as suitable interstitial elements. The percentage of interstitial elements is described to be in the range from 0.5 percent to 4.5 percent. The films made according to this patent are said to exhibit properties of variable access and variable magnetization threshold.

An object of the present invention, therefore, is to provide a storage subsystem having an enhanced magnetic transducer that is useful for accessing different data tracks of a storage medium.

SUMMARY OF THE INVENTION

In order to realize good recording properties for both perpendicular and longitudinal recordings, the saturation magnetization of head materials must be increased to prevent magnetic saturation of the pole pieces. For good soft magnetic properties in a magnetic transducer, low coercivity, anisotropy field and saturation magnetostriction are also important for the pole pieces of magnetic transducers. A multilayer material having alternating layers of FeN and NiFeN materials deposited by any technique such as sputtering, evaporation or electroplating result in a soft magnetic film having a saturation magnetization equal to or greater than 15 Kilogauss (1.5 Tesla (T)). The coercivity, anisotropy field and saturation magnetostriction are low to meet recording head requirements. The FeN layer can be an iron alloy including an element of from 0-10 atomic percent taken from the of nitrogen. The NiFeN layer can be a nickel-iron alloy ranging from 30-100 atomic percent of nickel with a nitrogen doping. The nitrogen doping level is greater than 0 and up to 10 atomic percent in NiFe.

The soft magnetic film of the present invention has a low coercivity and anisotropy field for thin film head application. The multilayer films can be deposited using an ion beam sputtering technique and can be confirmed with RF sputtering and magnetron sputtering techniques with some process optimization efforts. The film has a saturation magnetization of equal to or greater than 16 kilogauss (1.6 T) and an absolute saturation magnetostriction constant of less than $1 \times 10^{-6}$, which is one of the key requirements of thin film head applications. It is well known that the sign of the absolute saturation magnetostriction constant and the film stress should be of the same sign (positive or negative) to obtain good magnetic domain structures. The magnetostriction constant can be controlled by controlling the nitrogen flow rates and by controlling the thickness of the NiFeN layer. If an 81 percent nickel-19 percent iron target is used, the thickness ratio of 2.5 is held for the thickness ratio of the FeN to NiFeN layers. The constant will be less than $1 \times 10^{-6}$ and greater than $-1 \times 10^{-6}$, provided the FeN thickness is between 400 and 1000 Angstroms (40-100 nanometers (nm)). The saturation magnetization is higher than films having 81 atomic percent nickel and 19 atomic percent iron without the nitrogen.

A plurality of layers of the films made according to this invention have a use as pole pieces and shields for magnetic transducers; for instance, either inductive head elements or magnetoresistive (MR) head elements. Either one or both pole pieces of an inductive thin film head can be made of a plurality of alternating layers of NiFeN and FeN films. One or more shields in inductive and/or MR magnetic heads likewise can be made of multilayers of the film layers of the present invention to provide good magnetic properties, as well as high wear resistance and/or high hardness. Heads made according to this invention find use in magnetic disk and tape drives to read and/or write data information onto the media.

The film can be deposited by using ion beam sputtering, diode sputtering, magnetron sputtering, e-beam evaporation and electroplating to form a multilayer thin film of alternating layers of iron nitride and nickel-iron nitride. The thickness of each layer ranges from 10–1500 Angstroms (1–150 nm). The nickel composition in the nickel-iron layer ranges from 20–1000 atomic percent. The dopant ranges from greater than 0 to 20 atomic percent in the iron and the nickel-iron layers. A magnetic field of greater than 5 Oersted (400 ampere/meters (A/M)) is required at the substrate surface during deposition. The films can be annealed at a temperature between 100–300 degree Celsius (C) (473–673 degrees Kelvin (K)) with an applied magnetic field greater than 10 Oersteds (800 A/M) at the easy or hard axis direction of the films without degenerating their magnetic properties.

An object of the present invention, therefore, is to provide an enhanced multilayered ferromagnetic film.

Another object of the present invention is to provide a high saturation magnetization multilayered film with excellent hardness and magnetic properties.

Yet another object of the present invention is to provide magnetic films that are useful as pole pieces and shields in thin film head applications.

BRIEF DESCRIPTION OF THE DRAWING

The various novel features of this invention along with the foregoing and other objects, as well as the invention itself, both as to its organization and method of operation, may be more fully understood from the following description of illustrated embodiments when read in conjunction with the accompanying drawings wherein:

FIG. 4 is a cutaway section view taken along lines 4—4 of FIG. 3;

FIG. 5 is a sectional view of one example of the structure of a multilayered magnetic film in accordance with the present invention;

FIG. 6 is a sectional view of a write element of a magnetic head which can use the multilayered magnetic film of the present invention;

DESCRIPTION OF THE PREFERRED EMBODIMENTS

Figure 1:
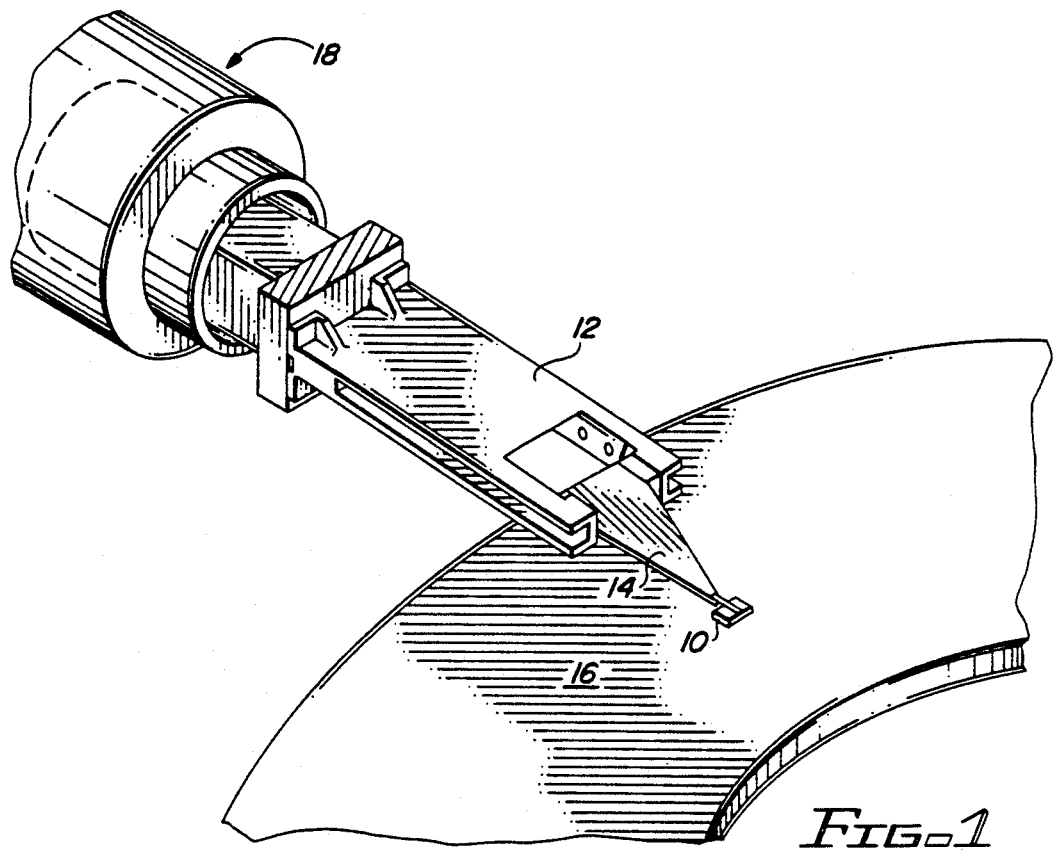
FIG. 1 is a perspective view of a disk drive actuator showing the magnetic transducer that can use the films according to the present invention.
Figure 2:
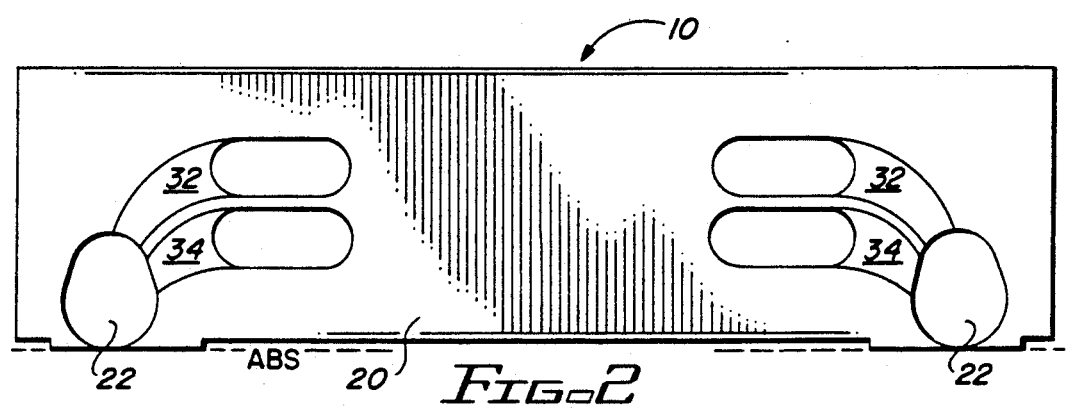
FIG. 2 is a side elevation view of the slider and transducers shown in FIG. 1.

With reference to FIG. 1, in order to show the usage of the films made according to the present invention, a magnetic disk storage system comprises a magnetic head 10 attached to an actuator arm assembly 12 via a suspension assembly 14. In the embodiments shown, only one magnetic head suspension assembly 14 is attached to the actuator arm 12 but it should be evident as is known in the art, that a plurality of suspension assemblies 14 and magnetic heads 10 are generally attached to a plurality of arms that are actuated by the actuator arm 12. Each suspension assembly 14 supports at its end a head 10, and each head 10 has one or more magnetic transducer means, generally coiled magnetic heads, disposed so that the transducing gap may be in transducing relationship with the surface of a magnetic disk 16, only one of which is shown in FIG. 1. Electrical signals are conducted from the magnetic head 10 to the storage system for use therein. The actuator arm 12 is attached to a conventional actuator 18, such as a voice coil motor, for example, for accessing the magnetic head 10 to area tracks on the magnetic disk 16. FIG. 2 shows a close up of the magnetic head 10 to show the structure of the slider and the transducers on the slider.

Figure 3:
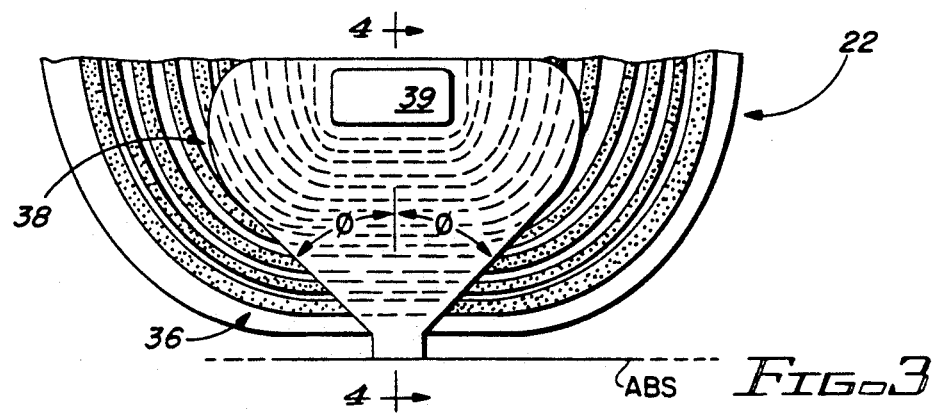
FIG. 3 shows an embodiment of a thin film head that can have its pole pieces include the films according to the present invention.

Referring to FIG. 2, the magnetic head 10 includes a slider 20 and two transducers 22 deposited onto the slider 20 at an air bearing surface (ABS), such that the transducers 22 are in a transducing relationship with the surface of the disk 16 (see FIG. 1). Each transducer 22 includes a pair of output conductors 32 and 34 for connection of the electrical signals to and from the transducers 22 of the magnetic head 10. FIG. 3 shows a close up view of one transducer 22 showing the shape of the pole pieces which are useful in using the soft magnetic films according to the present invention.

In FIG. 3, the transducer 22 includes a plurality of conductors 36 wrapped around a back gap 39 of the transducer 22 to the pole pieces 38 and 40, shown in FIG. 4. The transducer 22 is deposited directly onto the slider 20. The transducer 22 also includes a gap layer 42 and an insulation layer 44 to insulate the conductors 36 from the pole pieces. A thorough description of the transducer 22 shown in FIGS. 3 and 4 can be obtained from the U.S. Pat. No. 4,190,872. Another style of transducer that can utilize the films of invention is shown in U.S. Pat. No. 4,504,880, to Church et al, and assigned to the assignee of the present invention.

FIG. 5 is a sectional view of one example of the structure of a multilayered ferromagnetic alloy film of the present invention. In FIG. 5, the reference 100 denotes a main ferromagnetic material film including as its principal component iron nitride. The reference 102 denotes the ferromagnetic material layer having as its major constituents a nickel-iron nitride alloy. Both layers 100 and 102 are laminated onto a substrate 104 which could be the wafer which becomes the slider according to the embodiment of the present invention shown in FIG. 2. The present invention will be described in more detail in connection with examples.

There are nine layers in the film of FIG. 5 including five layers of the NiFeN film which sandwiches four layers of FeN in between the NiFeN film layers. Each layer is deposited in turn to form the total laminated structure. The soft magnetic film of the present invention has low coercivity and anisotropy field for thin film head application. The multilayer films can be deposited using an ion beam sputtering technique and can be confirmed with RF sputtering and magnetron sputtering techniques with some process optimization efforts. The film has a saturation magnetization of equal to or greater than 16 kilogauss (1.6 T) and an absolute saturation magnetostriction constant of less than $1 \times 10(-6)$, which is one of the key requirements of thin film head applications. It is well known that the sign of the absolute saturation magnetostriction constant and the film stress should be the same to obtain good magnetic domain structures.

FIG. 6 is a cross-sectional view of a write transducer as shown in a co-pending patent application entitled "MAGNETIC HEAD WITH ENHANCED POLETIP AND METHOD FOR MAKING" by Aboaf et al, Ser. No. 07/694,611, filed on May 2, 1991, and assigned to the assignee of the present invention. The write transducer is shown encompassed between a magnetic ferrite substrate 122 and a non-magnetic ceramic closure block 124. An arrow 116 shows the direction of motion of a media, such as a tape or disk past the transducer. An etch stop layer 146, preferably of amorphous alumina ($Al_2O_3$), is deposited for processing the subsequent layers. An additional first poletip 130 is then deposited on the etch stop layer 146. Both the additional first poletip 130 and the magnetic ferrite substrate 122 operate as the first pole piece of the transducer. A magnetic gap region 126 can include two layers of magnetic and electrical insulating layers 132 and 134, preferably of alumina. Activating conductor coil turns 136 are deposited onto the insulating gap layers 132 and 134. An electrical insulating material 138, such as hardened photoresist, is deposited over the coil turns 136. A second thin film pole piece 140 is deposited over the gap region 126 and the insulating layer 138. A support insulating layer 142, preferably of a hardened photoresist, is formed over the poletip section of the second pole piece 140. A leveling layer 144 is then formed over the second pole piece and the support insulation layer 142. The ceramic closure 124 completes the transducing element.

Reference is made to the above mentioned Patent Application for a more complete disclosure of the write transducer shown in FIG. 6.

The additional poletip 130 and/or the second pole piece 140 can be made using the advantages of the present invention. Improved magnetic properties result from the multilayer structure made from the present invention, as well as improved wear resistance.

The magnetic multilayer film made according to the present invention also can be used for shield layers in MR heads. Any standard MR head can use the advantages of the increased magnetic and mechanical properties of this invention as previously discussed. MR heads are finding increased use in tape and disk drives. One style of MR head that can use the present invention is U.S. Pat. No. 3,975,772, assigned to the assignee of the present invention.

Figure 7:
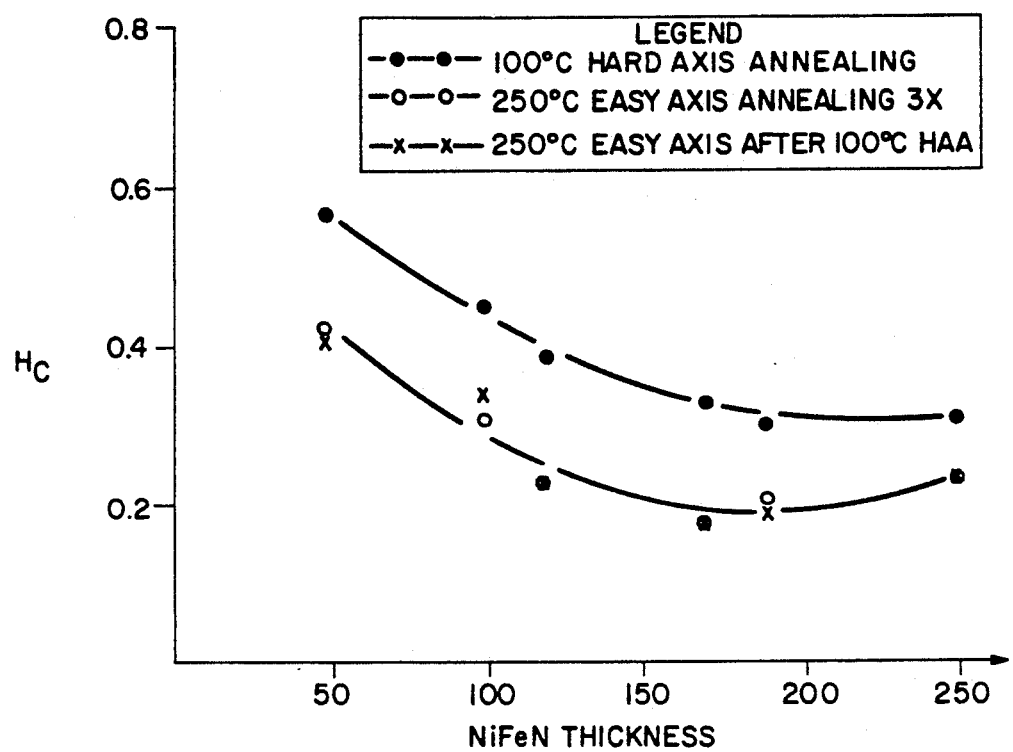
FIG. 7 is a graph comparing a coercivity of films made according to the invention versus a NiFeN film thickness at different annealing procedures.

FIG. 7 shows the coercivity (Hc) change in Oersteds as a function of the thickness in Angstroms of the NiFeN layers and various annealing cycles. The NiFeN layer included 84.3 atomic percent Ni, 13.7 atomic percent Fe, and 2 atomic percent N. Each annealing time is two hours at the temperature shown. The FeN layers included 4.5 atomic percent of N to a thickness of 500 Angstroms (50 nm). Easy axis and hard axis annealing implies that the heat treatment was done with an applied magnetic field of 700 gauss (0.07 T) along the easy and hard axis of the films, respectively. Without the NiFeN film layers, the coercivity of the film is about 8 Oersted (640 A/M). The coercivity value did not change appreciably for "as deposited" films with or without the NiFeN layers. The composition of the N in the FeN layers is 4.5 atomic percent and the Ni in the NiFe target is 86 atomic percent.

Figure 8:
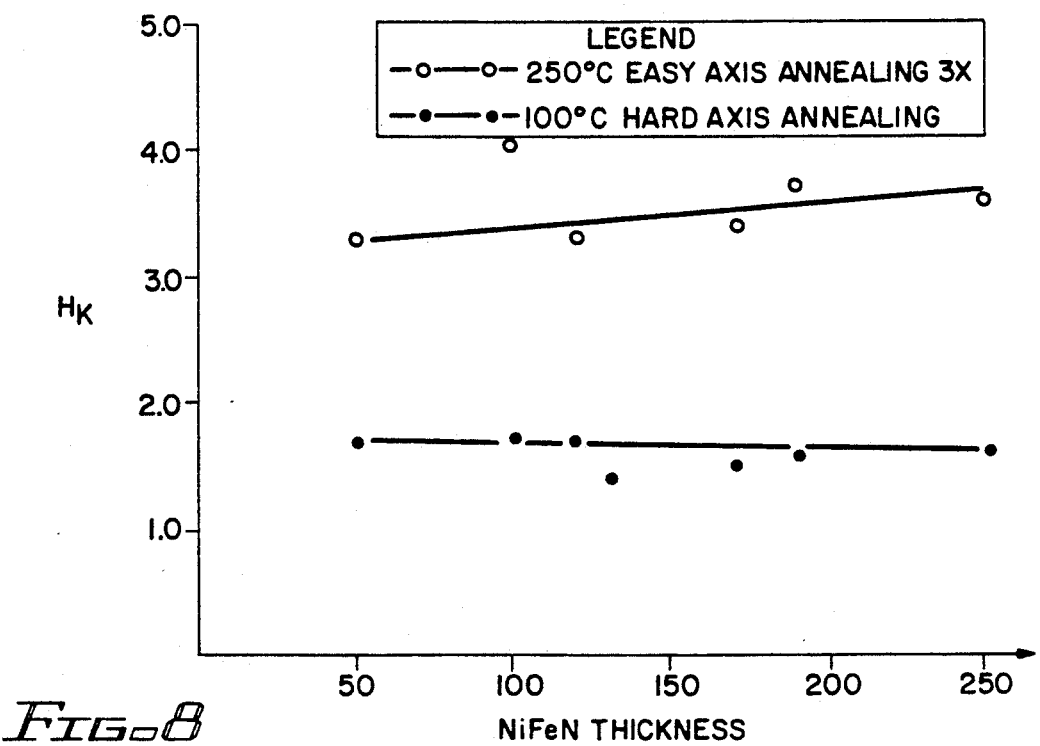
FIG. 8 is a graph of an anisotropy field of the films of the present invention as a function of NiFeN layer thickness.

FIG. 8 shows the anisotropy field (Hk) in Oersted change as a function of the NiFeN layer thickness in Angstroms. The NiFeN layer includes a composition of 2 atomic percent N and a 98 atomic percent alloy of 86 atomic percent Ni and 14 atomic percent Fe. The FeN layers included 4.5 atomic percent N and are 500 Angstroms (50 nm) thick. Without the NiFeN layer, the anisotropy of only the FeN layer is 10.0 Oersted (800 A/M). A 100 degree C. (373 degrees K.) hard axis annealing substantially lowered the anisotropy field. Increasing the thickness of the NiFeN layer changed the anisotropy value to approach 4.5 Oersted (360 A/M), which is the anisotropy value of the NiFeN layer only. This figure shows that the anisotropy field is within a required range when the NiFeN layer is thicker than 50 Angstroms (5 nm) per layer.

Figure 9:
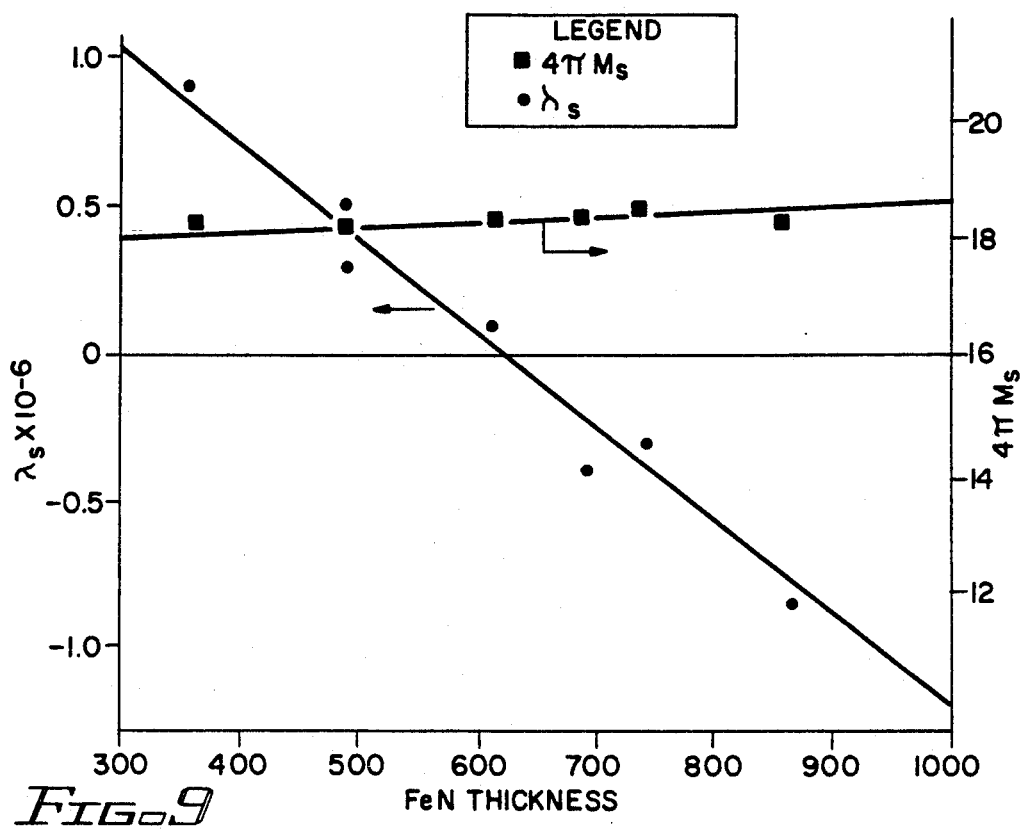
FIG. 9 is a graph of a saturation magnetostriction constant and a saturation magnetization of the films of the present invention as a function of FeN layer thickness.

FIG. 9 shows that the saturation magnetostriction constant and saturation magnetization in kilogauss changes as the thickness in Angstroms of the FeN layer increases. The thickness ratio of the FeN layers to the NiFeN layers is set at 2.5. The total film thickness is approximately 3000 Angstroms (300 nm). A target of 81 atomic percent Ni and 19 atomic percent Fe is used in the sputtering process. The nitrogen and argon flow rates for the deposition of the layers is 4 standard cubic centimeter per minute (SCCM) and 8 SCCM, respectively. The nine layers of the multilayer film of FIG. 5 is used in this graph. The saturation magnetization is approximately 18 kilogauss (1.8 T) and changed very little with the ratio of the thickness of the layers kept at 2.5. However, the saturation magnetostriction constant decreased from $+1.1 \times 10(-6)$ to $-1.2 \times 10(-6)$ as the FeN layer thickness increased from 300 to 1000 Angstroms (30 to 100 nm) per layer. Under this condition, the saturation magnetostriction constant of the multilayer films of this invention meets the zero magnetostriction constant, plus or minus $1.0 \times 10(-6)$ requirement if the FeN film thickness is in the range of 300 to 1000 Angstroms (30-100 nm) per layer. The saturation magnetostriction constant can be controlled using the multilayer film of this invention. This graph demonstrates that the saturation magnetization is a function of the thickness with a fixed thickness ratio. If the ratio is changed, the saturation magnetization changes a great amount.

Figure 10:
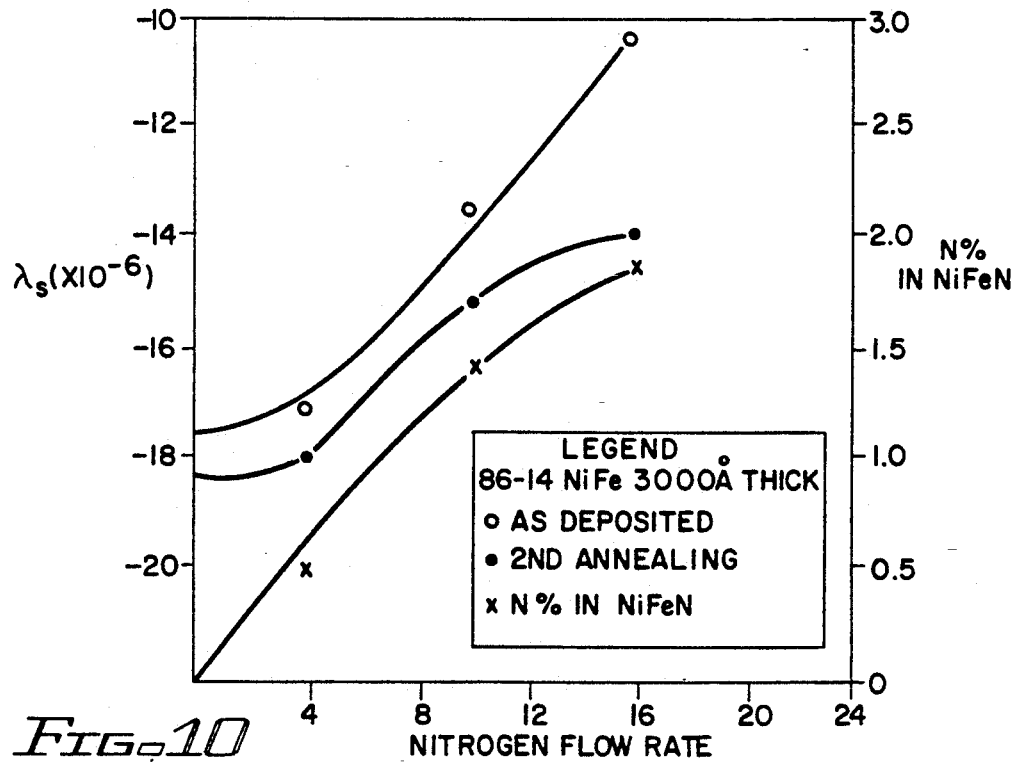
FIGS. 10 and 11 are graphs of the saturation magnetostriction constant of the NiFeN and FeN films, respectively, as a function of nitrogen flow rate and annealing process.
Figure 11:
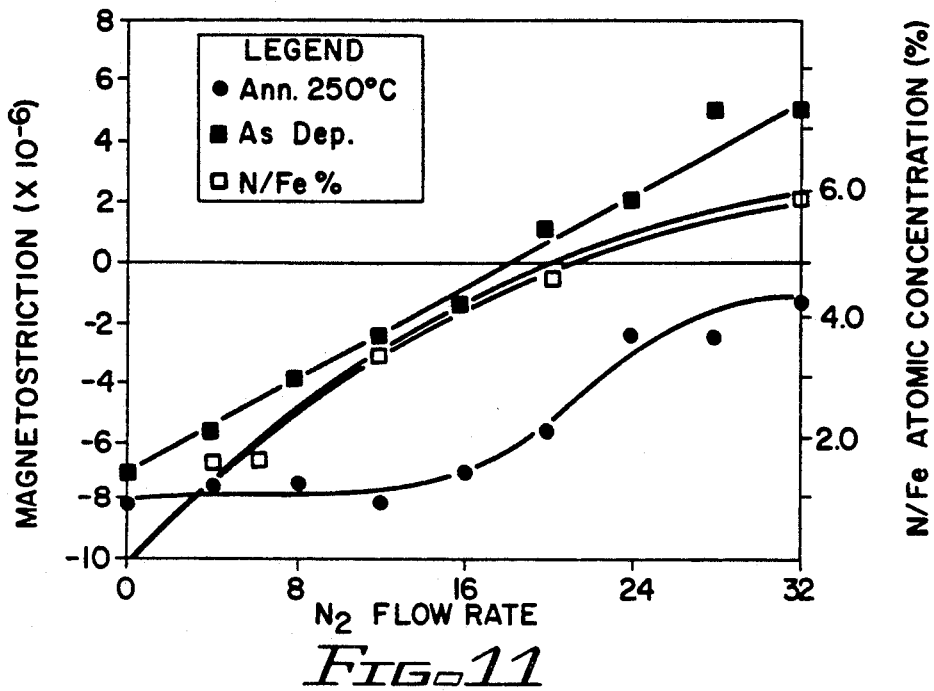

FIGS. 10 and 11 show that the saturation magnetostriction constant of the NiFeN layer, deposited using an 86 percent Ni 14 percent Fe target, and the FeN layer increase as the nitrogen or nitrogen/argon flow rate ratio increases. The flow rate is given in SCCM. The atomic percent of N content in both the FeN and NiFeN films increases as the flow rate of the nitrogen gas increases. After an annealing process at 250 degrees C. (523 degrees K.), the saturation magnetostriction constant of both the NiFeN and FeN films are negative. However, depositing the films in alternating sequence to form a multilayer film causes the saturation magnetostriction constant to become positive due to the possibility of interdiffusion between the layers, see FIGS 12 and 13. FIGS. 10 and 11 show that the saturation magnetostriction constant increases as the atomic percentage of nitrogen changes for both the NiFeN and FeN layers of the multilayer film. The amount of nitrogen in the films is an important factor in the control of the constant. The control of the amount of nitrogen flow rate determines the amount of atomic percent of nitrogen in the layers.

Figure 12:
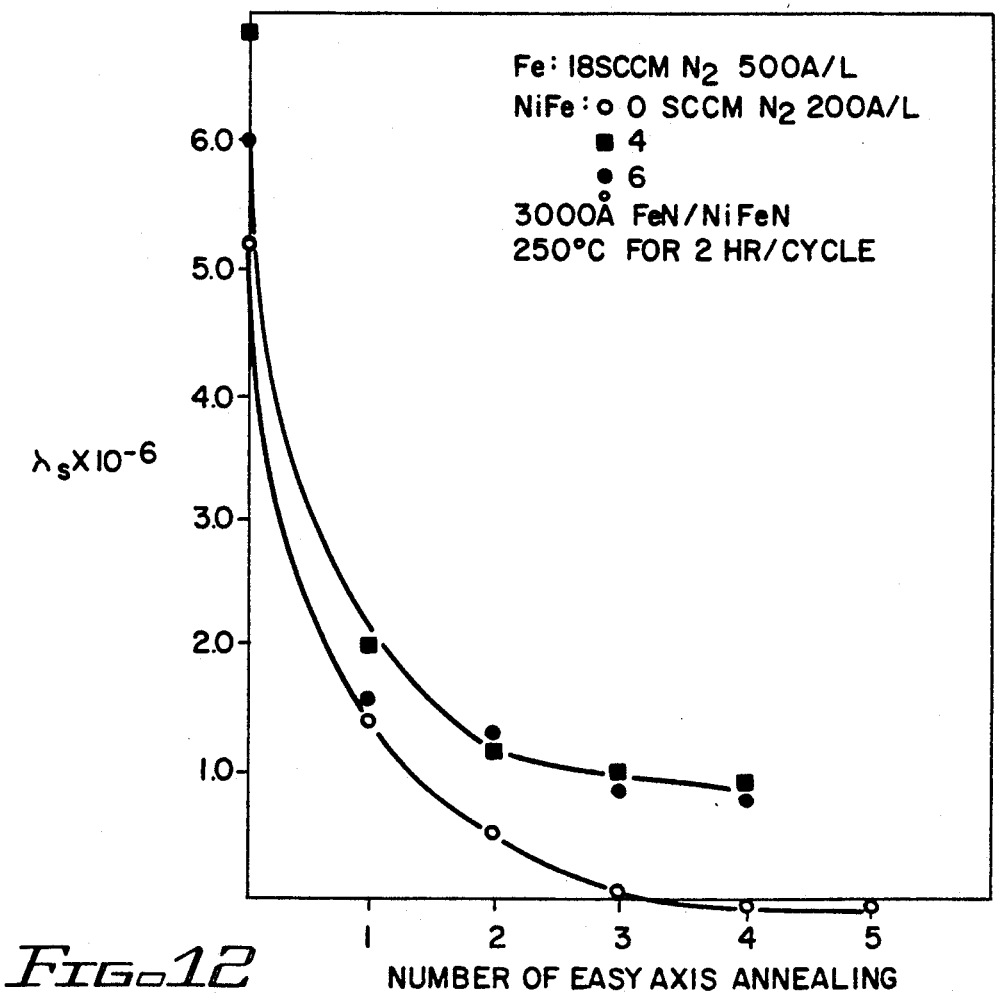
FIG. 12 is a graph showing the saturation magnetostriction of the films of the present invention as a function of annealing.

FIG. 12 shows the saturation magnetostriction constant change of three sets of multilayer films as the flow rate of the nitrogen changes during the deposition of the NiFeN layer. Three curves are shown, one for 0, 4, and 6 SCCM flow rate of nitrogen. Four annealing cycles are required to stabilize the constant. The FeN layers with layers of NiFe (no nitrogen added) as a multilayer film has a negative saturation magnetostriction constant after the four annealing cycles. For a compressive stress film, a negative constant is not desirable for head pole pieces. Therefore, to have the correct saturation magnetostriction constant, a nitrogen flow rate is required during the deposition of the NiFeN films to arrive at usable films for heads.

Figure 13:
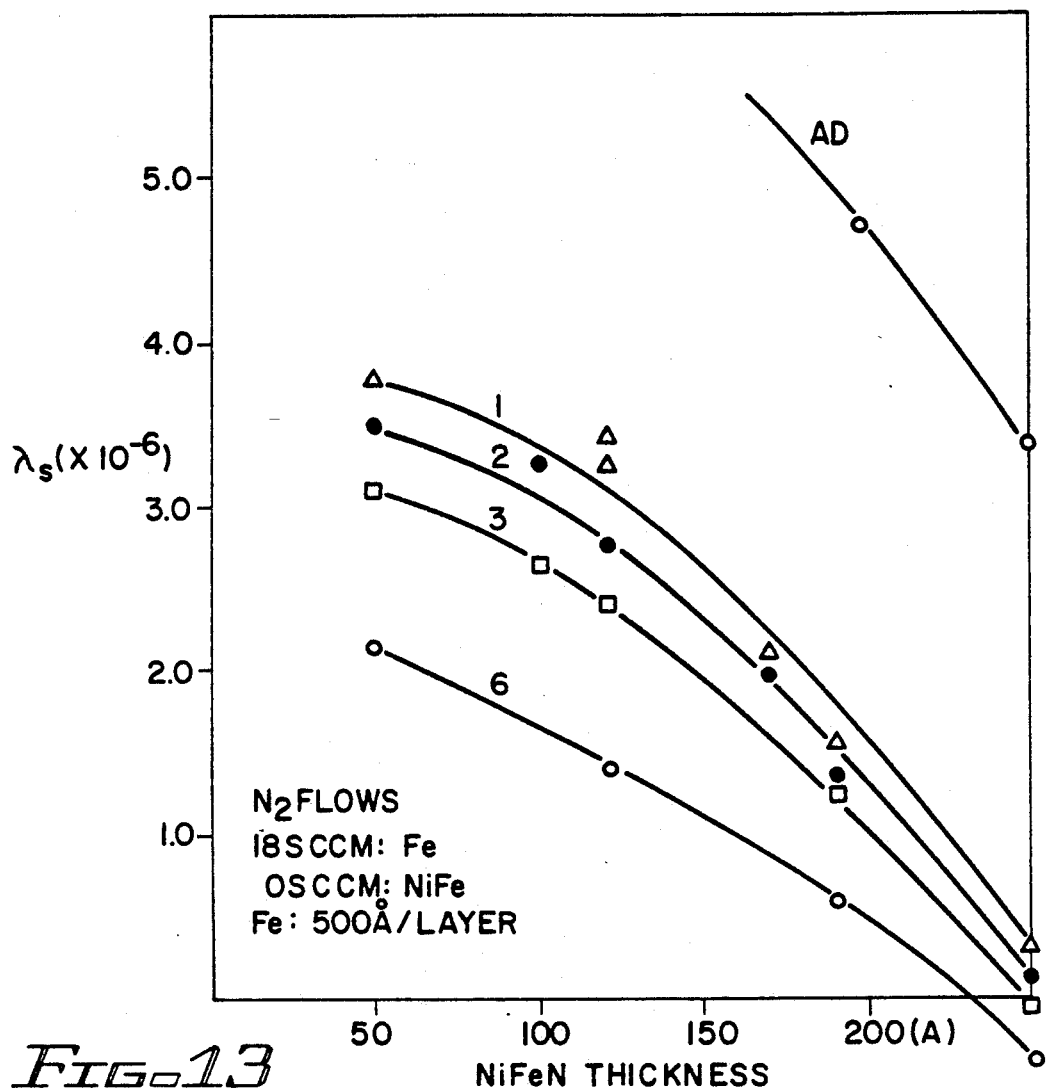
FIG. 13 is a graph showing the saturation magnetostriction of the films of the present invention as a function of NiFeN film thickness and annealing.

FIG. 13 shows the saturation magnetostriction constant changes as a function of the NiFeN thickness and the annealing cycles. The constant decreases as the thickness increases. The comparison is made with "as deposited" films; i.e., no annealing. The thicker the NiFeN layer per anneal cycle, the more stable the constant becomes. For the 500 Angstroms (50 nm) FeN and 250 Angstrom NiFeN multilayer films, the saturation magnetostriction constant becomes negative after the third easy axis anneal. For example, two pole pieces require two and six annealing cycles for the head fabrication process, the thickness of the FeN and NiFeN should be 240 and 200 Angstroms (24 and 20 nm) per layer, respectively. The saturation magnetostriction constant degeneration characteristic is eliminated by the deposition of the films at 200 degrees C. (473 degrees K.) or higher.

Figure 14:
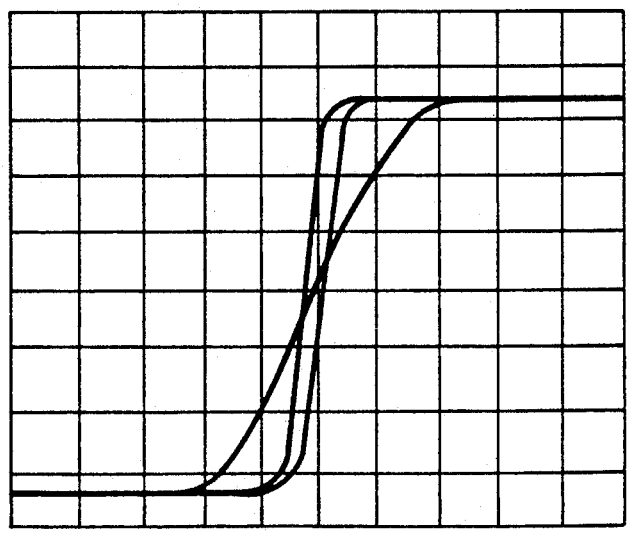
FIG. 14 is a graph showing a hysteresis loop of a typical multilayered ferromagnetic film made according to the present invention.

FIG. 14 shows a B-H hysteresis loop of a typical multilayer film made according to the principles of the present invention. The horizontal line represents 2 Oersteds per division. The multilayered film is 2 micrometers (Mm) thick using alternating layers of FeN and NiFeN layers. The films are easy axis annealed. The coercivity of the multilayered film is 0.3 Oersteds (24 A/M), the anisotropy is 3.8 Oersted (304 A/M) the saturation magnetization is 17.5 kilogauss (1.75 T) and the saturation magnetostriction constant is less than $1.0 \times 10(-6)$. The magnetic properties of the multilayer film meets the requirements of the pole pieces for a thin film head. FIG. 14 is a superimposed curve of both easy and hard axis loops which shows the goodness of the magnetic properties of the multilayer film. The coercivity and anisotropy field values should be less than 1 and 10 Oersted (80 and 800 A/M), respectively.

The saturation magnetostriction constant can be controlled by controlling the nitrogen flow rates, as shown in FIGS. 10, 11, 12 and 16, by controlling the thickness of the NiFeN and FeN layer, as shown in FIGS. 9 and 13, and by controlling the composition of the nickel and iron in the NiFeN layer, as shown in FIGS. 9, 12, 13 and 16. If an 81 atomic percent nickel-19 atomic percent iron target is used, the thickness ratio of 2.5 is held for the thickness ratio of the FeN to NiFeN layers, then, as shown in FIG. 9, the constant will be less than $1 \times 10(-6)$ and greater than $-1 \times 10(-6)$, provided the FeN thickness is between 400 and 1000 Angstroms (40 and 100 nm). The resultant multilayer films yield easy axis and hard axis B-H loops as is shown in FIG. 14.

Figure 15:
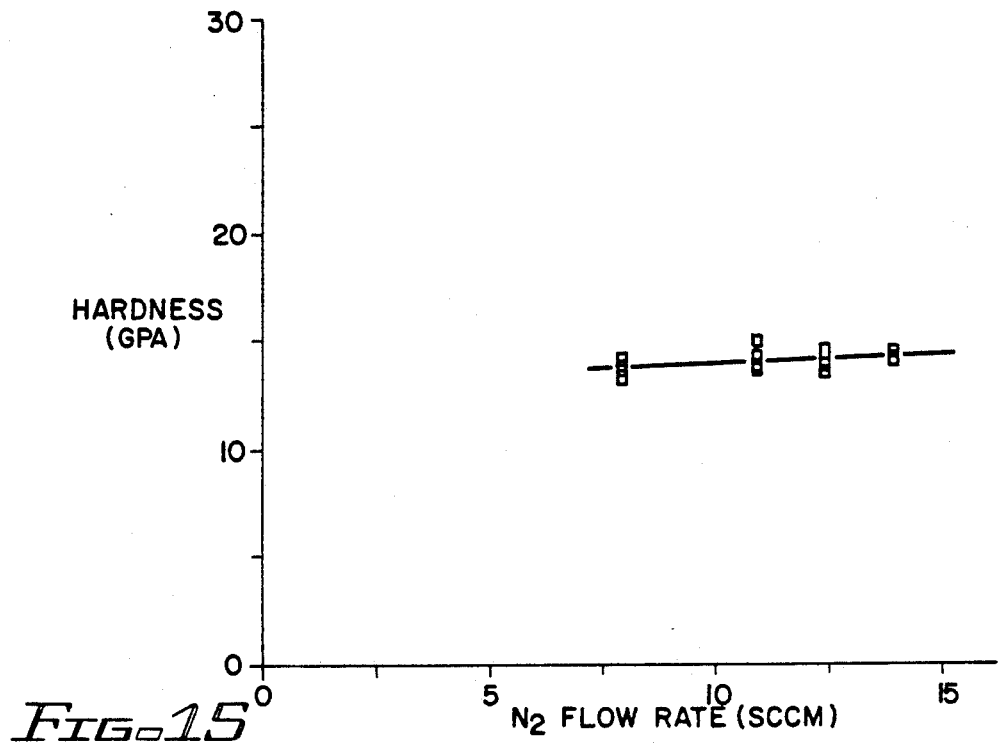
FIG. 15 is a graph showing a hardness of multilayered ferromagnetic films made according to the present invention as a function of nitrogen flow in the formation of the FeN layers.

FIG. 15 shows the increased hardness of thin films with the addition of the nitrogen to the layers. In FIG. 15 a multilayered film of 2 Mm thickness is deposited on glass using the basic structure as shown in FIG. 5. Each section includes a 200 Angstroms (20 nm) thickness of NiFeN and 500 Angstroms (50 nm) thickness of FeN. The hardness for a layer of NiFe is about 10 gigapascals (GPA). The hardness increases to approximately 15 GPA when the nitrogen is added to the films. Without the nitrogen doping, the film would not be hard enough, especially for use as shields in today's magnetic heads. In the graph, the NiFeN layers are deposited using an 86 atomic percent Ni and 14 atomic percent Fe target with a 3 SCCM flow rate of nitrogen. The FeN layers are deposited as shown in the graph. The argon flow rate is fixed to be 8 SCCM for sputtering both the NiFeN and FeN layers.

Figure 16:
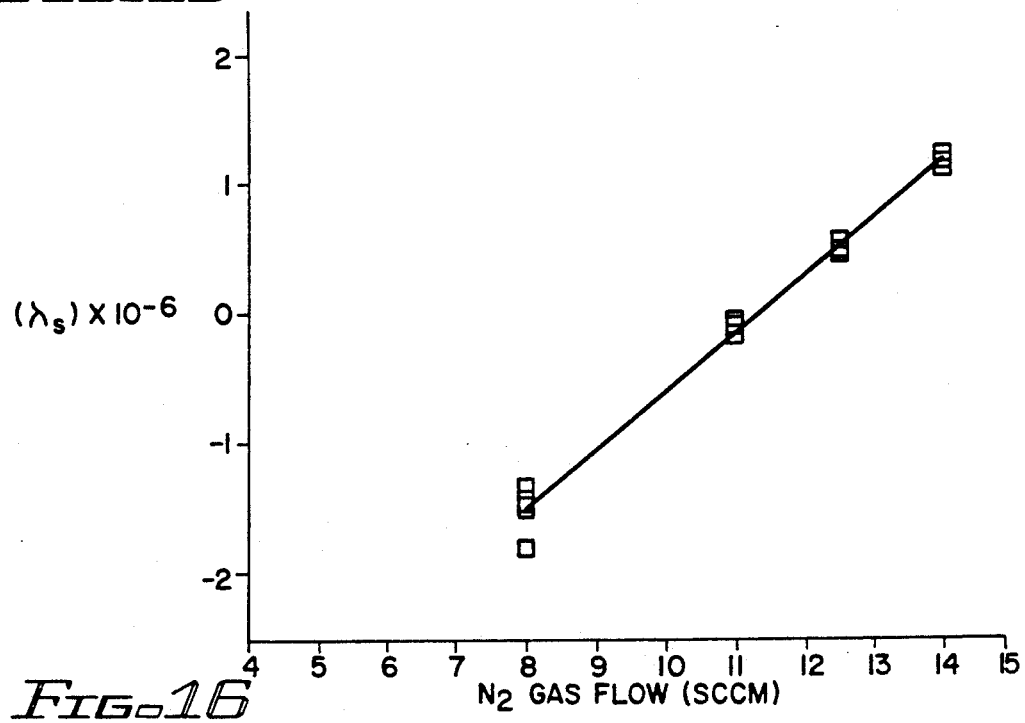
FIG. 16 is a graph showing the increase in magnetostriction of a film made according to the present invention as a function of the amount of nitrogen flow in the formation of the FeN layers.

FIG. 16 shows the increase in magnetostriction with an increase in the amount of nitrogen in the FeN films. For this graph, 29 layers of NiFeN alternated with 28 layers of FeN to produce the multilayer structure of 2 Mm in thickness. An 86 atomic percent Ni and 14 atomic percent Fe target with a nitrogen gas flow rate of 3 SCCM produced the NiFeN films, each being 200 Angstroms (20 nm) thick. The FeN layers are deposited with the flow rate shown in the graph and are 500 Angstroms (50 nm) thick. The multilayer structure is annealed at 250 degrees C. (523 degrees K.) with a magnetic field of greater than 10 Oersted (800 A/M) at the easy axis direction. Argon flow is fixed at 8 SCCM to sputter both the NiFeN and FeN layers. As shown in the graph, the magnetostriction constant increased as the amount of nitrogen in the FeN layer increased. The multilayer films of the present invention can be deposited by using ion beam sputtering, diode sputtering, magnetron sputtering, e-beam evaporation and electroplating to form a multilayer thin film of alternating layers of iron nitride and nickel-iron nitride. The thickness of each layer ranges from 10-1500 Angstroms (1-150 nm). The nickel composition in the nickel-iron layer ranges from 20-99 percent. The dopant ranges from greater than 0 to 20 atomic percent in the iron and the nickel-iron layers. A magnetic field of greater than 10 Oersted (800 A/M) is required at the substrate surface during deposition. The films can be annealed at a temperature between 100-300 degree C. (373-573 degrees K.) with an magnetic field greater than 10 Oersteds (800 A/M) at the easy or hard axis direction of the films without degenerating their magnetic properties.

The principles of the present invention have now been made clear in an illustrative embodiment. There will be, immediately obvious to those skilled in the art, many modifications of structure, arrangement, proportion, the element, materials, and components used in the practice of the invention. For instance while nine layers are shown in FIG. 5 for the preferred embodiment of the multilayer film of the present invention, it should be obvious that other numbers of layers could be used in the practice of this invention. The appended claims are, therefore, intended to cover and embrace any such modification, within the limits only of the true spirit and scope of the invention.

What is claimed is:

1. A multilayered soft magnetic film structure comprising:
    a first magnetic film of a predetermined thickness, said first magnetic film being made of a magnetic alloy comprising nickel, iron and nitrogen; and
    a second magnetic film of a predetermined thickness, said second magnetic film being made of a magnetic material including iron and nitrogen;
    said first and second magnetic films being laminated to provide the multilayered film structure having an alternating plurality of said first magnetic films and said second magnetic films.

2. A multilayer soft magnetic film structure as defined in claim 1 wherein said first and second magnetic films have thicknesses ranging from 10 to 1500 Angstroms in thickness.

3. A multilayer soft magnetic film structure as defined in claim 1 wherein said first magnetic film has a nickel composition of from 20 to 99 atomic percent of nickel and said first and second magnetic films have a nitrogen composition of from greater than 0 to 20 atomic percent.

4. A multilayer soft magnetic film structure as defined in claim 1 wherein said first and second magnetic films are vacuum deposited and the nitrogen is added to said films by flowing nitrogen gas.

5. A multilayer soft magnetic film structure as defined in claim 4 wherein said first and second magnetic films are deposited in a magnetic field of greater than 10 Oersted.

6. A multilayer soft magnetic film as defined in claim 1 wherein said first magnetic film has a nickel-iron alloy having a nickel composition ranging from 20 to 99 atomic percent of nickel with a nitrogen doping of greater than 0 and up to 10 atomic percent in said nickel-iron alloy and said second magnetic film includes nitrogen ranging of from greater than 0 to 20 atomic percent.

7. A magnetic head comprising:
    a substrate;
    a first magnetic pole piece deposited on said substrate;
    a magnetic insulating layer covering said first pole piece and forming a magnetic gap;
    a second magnetic pole piece deposited to create a magnetic circuit with said first pole piece; and
    conductor coils formed between said first and second magnetic pole pieces to activate said magnetic pole pieces;
    said first and second magnetic pole pieces each including multilayered soft magnetic films having alternating first and second film layers;
    said first magnetic film layer being of a predetermined thickness, and made of a magnetic alloy comprising nickel, iron and nitrogen;
    said second magnetic film layer being of a predetermined thickness, and made of a magnetic material including iron and nitrogen; and
    said first and second magnetic film layers being alternately laminated to provide a multilayered film structure.

8. A magnetic head as defined in claim 7 wherein said first and second magnetic films each have thicknesses per layer ranging from 10 to 1500 Angstroms in thickness.

9. A magnetic head defined in claim 7 wherein said first magnetic film has a nickel composition of from 20 to 99 atomic percent of nickel and said first and second magnetic films have a nitrogen composition of from greater than 0 to 10 atomic percent.

10. A magnetic head as defined in claim 7 wherein said first and second magnetic films are vacuum deposited and the nitrogen is added to said films by flowing nitrogen gas.

11. A magnetic head as defined in claim 7 wherein said first magnetic film has a nickel-iron alloy having a nickel composition ranging from 20 to 99 atomic percent of nickel with a nitrogen doping of greater than 0 and up to 20 atomic percent in said nickel-iron alloy and said second magnetic film includes nitrogen ranging of from 0 to 10 atomic percent.

12. A magnetic head as defined in claim 11 wherein said first magnetic film has a nickel-iron alloy of approximately 86 atomic percent nickel and 14 atomic percent iron, and a thickness ratio of approximately 2.5 of said second magnetic film to said first magnetic film and a saturation magnetostriction constant of less than $1 \times 10(-6)$ and greater than $-1 \times 10(-6)$, said second magnetic film thickness being approximately 400 to 1000 Angstroms.

13. A magnetic head comprising:
    a substrate;
    a first magnetic pole piece deposited on said substrate;
    a magnetic insulating layer covering said first pole piece and forming a magnetic gap;
    a second magnetic pole piece deposited to create a magnetic circuit with said first pole piece; and
    conductor coils formed between said first and second magnetic pole pieces to activate and sense said magnetic pole pieces;
    either said first or said second magnetic pole pieces including multilayered soft magnetic films having alternating first and second film layers;
    said first magnetic film layer being of a predetermined thickness, and made of a magnetic alloy comprising nickel, iron and nitrogen;
    said second magnetic film layer being of a predetermined thickness, and made of a magnetic material including iron and nitrogen; and
    said first and second magnetic film layers being alternately laminated to provide a multilayered film structure.

14. A magnetic head as defined in claim 13 wherein said first and second magnetic films each have thicknesses per layer ranging from 10 to 1500 Angstroms in thickness.

15. A magnetic head defined in claim 13 wherein said first magnetic film has a nickel composition of from 20 to 99 atomic percent of nickel and said first and second magnetic films have a nitrogen composition of from greater than 0 to 20 atomic percent.

16. A magnetic head as defined in claim 13 wherein said first and second magnetic films are vacuum deposited and the nitrogen is added to said films by flowing nitrogen gas.

17. A magnetic head as defined in claim 13 wherein said first magnetic film has a nickel-iron alloy having a nickel composition ranging from 20 to 99 atomic percent of nickel with a nitrogen doping of greater than 0 and up to 20 atomic percent in said nickel-iron alloy and said second magnetic film includes nitrogen ranging of from 0 to 20 atomic percent.

18. A magnetic head as defined in claim 17 wherein said first magnetic film has a nickel-iron alloy of approximately 86 atomic percent nickel and 14 atomic percent iron, and a thickness ratio of approximately 2.5 of said second magnetic film to said first magnetic film and a saturation magnetostriction constant of less than $1 \times 10(-6)$ and greater than $-1 \times 10(-6)$, said second magnetic film thickness being approximately 400 to 1000 Angstroms.

19. A magnetic head including at least one magnetoresistive (MR) element and at least one shield for the at least one MR element, wherein said shield includes a multilayered soft magnetic film comprising:
a first magnetic film of a predetermined thickness, said first magnetic film being made of a magnetic alloy comprising nickel, iron and nitrogen;
a second magnetic film of a predetermined thickness, said second magnetic film being made of a magnetic material including iron and nitrogen; and
said first and second magnetic films being laminated to provide the multilayered film structure having an alternating plurality of said first magnetic films and said second magnetic films.

20. A multilayer soft magnetic film structure as defined in claim 19 wherein said first and second magnetic films have thicknesses ranging from 10 to 1500 Angstroms in thickness.

21. A multilayer soft magnetic film structure as defined in claim 19 wherein said first magnetic film has a nickel composition of from 20 to 99 atomic percent of nickel and said first and second magnetic films have a nitrogen composition of from greater than 0 to 20 atomic percent.

22. A multilayer soft magnetic film structure as defined in claim 19 wherein said first and second magnetic films are vacuum deposited and the nitrogen is added to said films by flowing nitrogen gas.

23. A multilayer soft magnetic film structure as defined in claim 19 wherein said first magnetic film has a nickel-iron alloy having a nickel composition ranging from 20 to 99 atomic percent of nickel with a nitrogen doping of greater than 0 and up to 20 atomic percent in said nickel-iron alloy and said second magnetic film includes nitrogen ranging of from greater than 0 to 20 atomic percent.

24. A magnetic head comprising:
a substrate;
a first magnetic pole piece deposited on said substrate;
a magnetic insulating layer covering said first pole piece and forming a magnetic gap;
a second magnetic pole piece deposited to create a magnetic circuit with said first pole piece; and
conductor coils formed between said first and second magnetic pole pieces to activate said magnetic pole pieces;
either said first or said second magnetic pole pieces including multilayered soft magnetic films having alternating first and second film layers;
said second magnetic film layer being of a predetermined thickness, and made of a magnetic alloy comprising nickel, iron and nitrogen;
said first magnetic film layer being of a predetermined thickness, and made of a magnetic material including iron and nitrogen; and
said first and second magnetic film layers being alternately laminated to provide a multilayered film structure.

25. A method for making a multilayered soft magnetic film comprising:
depositing a first magnetic film of a predetermined thickness in a magnetic field of greater than 10 Oersted, said first magnetic film being made of a magnetic alloy comprising nickel, iron and nitrogen;
depositing a second magnetic film of a predetermined thickness in a magnetic field of greater than 10 Oersted, said second magnetic film being made of a magnetic material including iron and nitrogen;
forming a film structure of said first and second magnetic films, said film structure including a laminated magnetic structure having alternating layers of a plurality of said first magnetic films and a plurality of said second magnetic films; and
annealing said laminated magnetic structure in a magnetic field of greater than 10 Oersted at a temperature of from 100 to 300 degrees centigrade.

26. A method for making a multilayer soft magnetic film as defined in claim 25 wherein said first and second magnetic films have thicknesses ranging from 10 to 1500 Angstroms in thickness.

27. A method for making a multilayer soft magnetic film as defined in claim 26 wherein said first magnetic films include a nickel composition ranging of from 20 to 99 atomic percent and the nitrogen in said first and second magnetic films has a range of greater than 0 to 20 atomic percent.

28. A method for making a multilayer soft magnetic film as defined in claim 25 wherein said first magnetic film has a nickel composition of from 20 to 99 atomic percent of nickel and said first and second magnetic films have a nitrogen composition of from greater than 0 to 20 atomic percent.

29. A method for making a multilayer soft magnetic film as defined in claim 25 wherein said first and second magnetic films are vacuum deposited and the nitrogen is added to said films by flowing nitrogen gas into the deposition chamber.

30. A thin film inductive transducer for recording magnetic transitions on a magnetic recording medium, said transducer being of the type comprising two layers of a magnetic material forming a yoke structure that is activated by a conductor coil, all deposited on a slider substrate and supported over the media, characterized in that at least one layer comprises a laminate of a plurality of first magnetic films of a predetermined thickness and made of a magnetic alloy of nickel, iron and nitrogen where nitrogen is present substantially within the range of from greater than 0 to 20 atomic percent, alternating with a plurality of second magnetic films of a predetermined thickness and made of an alloy of iron and nitrogen where nitrogen is present substantially within the range of from greater than 0 to 20 atomic percent.

31. A storage device comprising:
a magnetic media;
at least one transducer;
means for supporting each of said at least one transducer in sensing position relative to said media;
means for providing relative motion between said media and said transducer;
said transducer operable to at least form magnetic transitions on said media;
said transducer being of a type having two layers of a magnetic material forming a yoke structure that is activated by a conductor coil, all deposited on a substrate attached to said supporting means and characterized in that at least one layer includes a multilayered ferromagnetic film of a plurality of first magnetic films of a predetermined thickness and made of a magnetic alloy of nickel, iron and nitrogen where nitrogen is present substantially within the range of from greater than 0 to 20 atomic percent, alternating with a plurality of second magnetic films of a predetermined thickness and made of an alloy of iron and nitrogen where nitrogen is present substantially within the range of from greater than 0 to 20 atomic percent.

32. A storage device comprising:
a magnetic media;
at least one transducer;
means for supporting each of said at least one transducer in sensing position relative to said media;
means for providing relative motion between said media and said transducer;
said transducer operable to at least read magnetic transitions from said media;
said transducer being of a type having a magnetoresistive element deposited on a substrate attached to said supporting means and characterized in that at least one layer of said transducer includes a multilayered ferromagnetic film of a plurality of first magnetic films of a predetermined thickness and made of a magnetic alloy of nickel, iron and nitrogen where nitrogen is present substantially within the range of from greater than 0 to 20 atomic percent, alternating with a plurality of second magnetic films of a predetermined thickness and made of an alloy of iron and nitrogen where nitrogen is present substantially within the range of from greater than 0 to 20 atomic percent.

* * * * *